United States Patent [19]

Murakami

[11] Patent Number: 5,581,983
[45] Date of Patent: Dec. 10, 1996

[54] GAS INJECTION DEVICE FOR GAS BAG HAVING SERIAL CLOSED CELLS

[75] Inventor: Sadaji Murakami, Ayabe, Japan

[73] Assignee: Shinwa Corporation, Hyogo, Japan

[21] Appl. No.: 464,852

[22] PCT Filed: Nov. 5, 1993

[86] PCT No.: PCT/JP93/01606

§ 371 Date: Sep. 6, 1995

§ 102(e) Date: Sep. 6, 1995

[87] PCT Pub. No.: WO95/12532

PCT Pub. Date: May 11, 1995

[51] Int. Cl.[6] .................................................. B65B 31/00
[52] U.S. Cl. ................................ 53/512; 53/79; 53/139.5; 156/145
[58] Field of Search ........................... 53/432, 473, 474, 53/79, 512, 139.5; 156/494, 145, 147

[56] References Cited

U.S. PATENT DOCUMENTS

| | | | |
|---|---|---|---|
| 3,389,534 | 6/1968 | Pendleton | 53/79 |
| 3,817,803 | 6/1974 | Horsky | 53/79 |
| 3,938,298 | 2/1976 | Luhman et al. | 53/79 |
| 4,017,351 | 4/1977 | Larson et al. | |
| 4,597,244 | 7/1986 | Pharo | 53/512 |
| 5,070,675 | 12/1991 | Chuan-Shiang | 53/512 |
| 5,121,595 | 6/1992 | Shore | 53/79 |
| 5,216,868 | 6/1993 | Cooper et al. | 53/79 |

FOREIGN PATENT DOCUMENTS

| | | |
|---|---|---|
| 109105A1 | 5/1984 | European Pat. Off. . |
| 512187A1 | 11/1992 | European Pat. Off. . |
| 2243868 | 9/1973 | France . |
| 775726 | 5/1957 | United Kingdom . |
| WO93/01107 | 1/1993 | WIPO . |

*Primary Examiner*—John Sipos
*Assistant Examiner*—Ed Tolan
*Attorney, Agent, or Firm*—Nikaido, Marmelstein, Murray & Oram LLP

[57] ABSTRACT

This invention relates to a gas injection device for automatically supplying a flow of gas to a gas bag having serial closed cells to be used, for example, as a cushioning material for packaging operation. The gas injection device for a gas bag having serial closed cells includes a core (23) adapted to be inserted into a passage (19) of the gas bag (12), the core having a longitudinally intermediate portion (26) of a reduced diameter, at least two pinch rollers (21) for pressingly clamping said gas bag (12) at the position of the longitudinal intermediate portion (26) of a reduced diameter of the core (23), so as to drive the gas bag (12) in the longitudinal direction, a nozzle adapter (29) adapted to be withdrawably insertable into the opening of the passage (19) which is opened by the core (23) inserted therein, a displacer means for displacing the nozzle adapter (29) in a manner in which the nozzle adapter (29) is not displaced from the opening of the passage (19), when the gas bag (12) is driven in the longitudinal direction, a gas supply means (31, 32) adapted to be connected with the nozzle adapter (29), a nip means (33) for pressingly clamping the gas bag (12), so as to close the passage (19) of the gas bag (12) having been displaced a predetermined distance in the longitudinal direction at the terminal end of the core (23), and a cutter means (34) for severing the terminal end of the gas bag (12) along its entire width.

7 Claims, 4 Drawing Sheets

5,581,983

1

GAS INJECTION DEVICE FOR GAS BAG HAVING SERIAL CLOSED CELLS

TECHNICAL FIELD

This invention relates to a gas injection device for a gas bag having serial closed cells.

PRIOR ART

A gas bag having serial closed cells to be used as a cushioning material for packaging purpose or air mattress is known from, for example, Japanese Patent Public Disclosure (KOKAI) No. 01(1989)-153829.

The gas bag having serial closed cells disclosed therein includes a belt-like bag body consisting of a front sheet and a back sheet superposed one another. The bag body includes serial closed cells extending along the length thereof. The bag body also includes a passage extending along the length thereof for supplying gas into each individual closed cell. A check valve is disposed between the passage and each individual closed cell.

The gas bag prior to use is not supplied with gas. The front sheet and the back sheet are superposed one another in close contact relationship so as to form a continuous, belt-like configuration which is wound in a roll.

In use, the roll of gas bags is unwound and cut by a predetermined length so as to form a gas bag of a finite length having serial closed cells. One end of the passage for receiving gas is closed. Then, the opposite end of the passage is fitted with an air nozzle. A quantity of gas such as air is injected into the passage. The gas injected is flown from the passage into the individual closed cells, whereby the closed cells are inflated. Any leakage of the gas supplied to the individual closed cells is prevented by means of the check valves.

The thus inflated gas bag is used as a cushioning material for packaging purpose or an air mattress.

Conventionally, the above-mentioned gas injection has been performed by means of a manual operation.

In the gas bag prior to gas injection, the front sheet and the back sheet are superposed one another in a close contact relationship, so that the passage for gas injection is also sealingly closed.

Accordingly, it is necessary to release the sealingly closed condition of the passage when the air nozzle is fitted in the opening of the passage. The release operation essentially depends upon a manual operation.

Thus, the gas injection operation has been totally performed by a manual operation in prior art.

It is noted, however, that such manual operation is not efficient. Accordingly, mechanization realizing a full automatic gas injection operation is desired.

The main object of the invention is to provide a gas injection device for a gas bag having serial closed cells which is capable of opening a sealingly closed passage so as to perform automatic fitting of a nozzle relative to the passage.

SUMMARY OF THE INVENTION

In order to achieve the above object, the invention provides a gas injection device for supplying gas into a gas bag, the gas bag including a front sheet and a back sheet superposed one another to form a belt-like bag body, the bag body including a plurality of closed cells serially arranged in

2 the length of the gas bag, the bag body also including a passage extending along the length of the gas bag for supplying gas into the individual closed cells, the bag body further including a check valve between the passage and the individual closed cells, the gas injection device is featured by a core adapted to be inserted into the passage, the core having a longitudinally intermediate portion of a reduced diameter; at least two pinch rollers for pressingly clamping the gas bag inwardly from the front sheet and back sheet of the gas bag at the position of the longitudinal intermediate portion of a reduced diameter of the core, so as to drive the gas bag in the longitudinal direction; a nozzle adapter adapted to be withdrawably insertable into the opening of the passage which is opened by the core inserted therein; a displacer means for displacing the nozzle adapter in a manner in which the nozzle adapter is not displaced from the opening of the passage, when the gas bag is driven in the longitudinal direction; a gas supply means adapted to be connected with the nozzle adapter; a nip means for pressingly clamping the gas bag inwardly from the front sheet and back sheet, so as to close the passage of the gas bag having been displaced a predetermined distance in the longitudinal direction at the downstream terminal end of the core; and a cutter means for severing the terminal end of the gas bag along its entire width.

OPERATION

According to the invention, the core is manually inserted into the passage of the gas bag. The pinch rollers pressingly clamp the gas bag inwardly from the front sheet and the back sheet, so that the intermediate portion of a reduced diameter of the core is clamped by the pinch rollers. The insertion of the core into the passage of the gas bag causes the passage to be opened, so that it is possible for the nozzle adapter to be automatically fitted in the opening of the passage.

When the nozzle adapter has been fitted in the opening of the passage, the pinch rollers are driven. The gas bag is fed downstream by reason of the rotation of the pinch rollers. At this time, the core also tends to be moved downstream together with the gas bag. It is noted, however, that, since the core is clamped, at the reduced portion thereof, by the pinch rollers, the forward, enlarged portion of the core cannot pass through the gap between the pair of pinch rollers. Thus, the core is prevented from moving in the downstream direction, so that the core is remained at the position of the pinch rollers, whereby only the gas bag is moved downstream.

When the gas bag is moved, the nozzle adapter is displaced by the displacer means in a manner that the nozzle adapter will not be displaced from the opening of the passage.

When a predetermined length of gas bag has been fed, the pinch rollers are stopped. Then, the nip means pressingly clamps the front sheet and the back sheet at a terminal end of the gas bag corresponding to a position downstream of and adjacent to the core, whereby the passage is closed.

The passage is supplied with a flow of gas through the nozzle adapter by means of the gas supply means. The gas supplied is flown into the individual closed cells through the respective check valves, since the terminal end of the passage is closed by the nip means. Each of the closed cells is inflated by the gas supplied. The gas flown into the individual closed cells is prevented from backflowing into the passage by reason of the provision of the check valves.

When a predetermined volume of gas has been supplied to the individual closed cells, gas supply from the gas supply means is stopped. Then, the terminal end portion (corresponding to a position downstream of and adjacent to the core) of the gas bag is cut by the cutter means.

The gas bag cut into a predetermined length is removed from the nozzle adapter. Such gas bag is used as a cushioning material for packaging purposes or air mattresses.

The passage of the continuous length of gas bag cut from the gas bag product and held by the pinch rollers remains to be inserted by the core. Thus, the end of such continuous length of gas bag adjacent the core is opened. The nozzle adapter is moved, by means of the displacer means, toward the open end of the continuous length of gas bag held by the pinch rollers and fitted therein.

The above operation is repeated, so that gas bag products charged with gas are continuously produced.

BEST MODE FOR CARRYING OUT THE INVENTION

Figure 4:
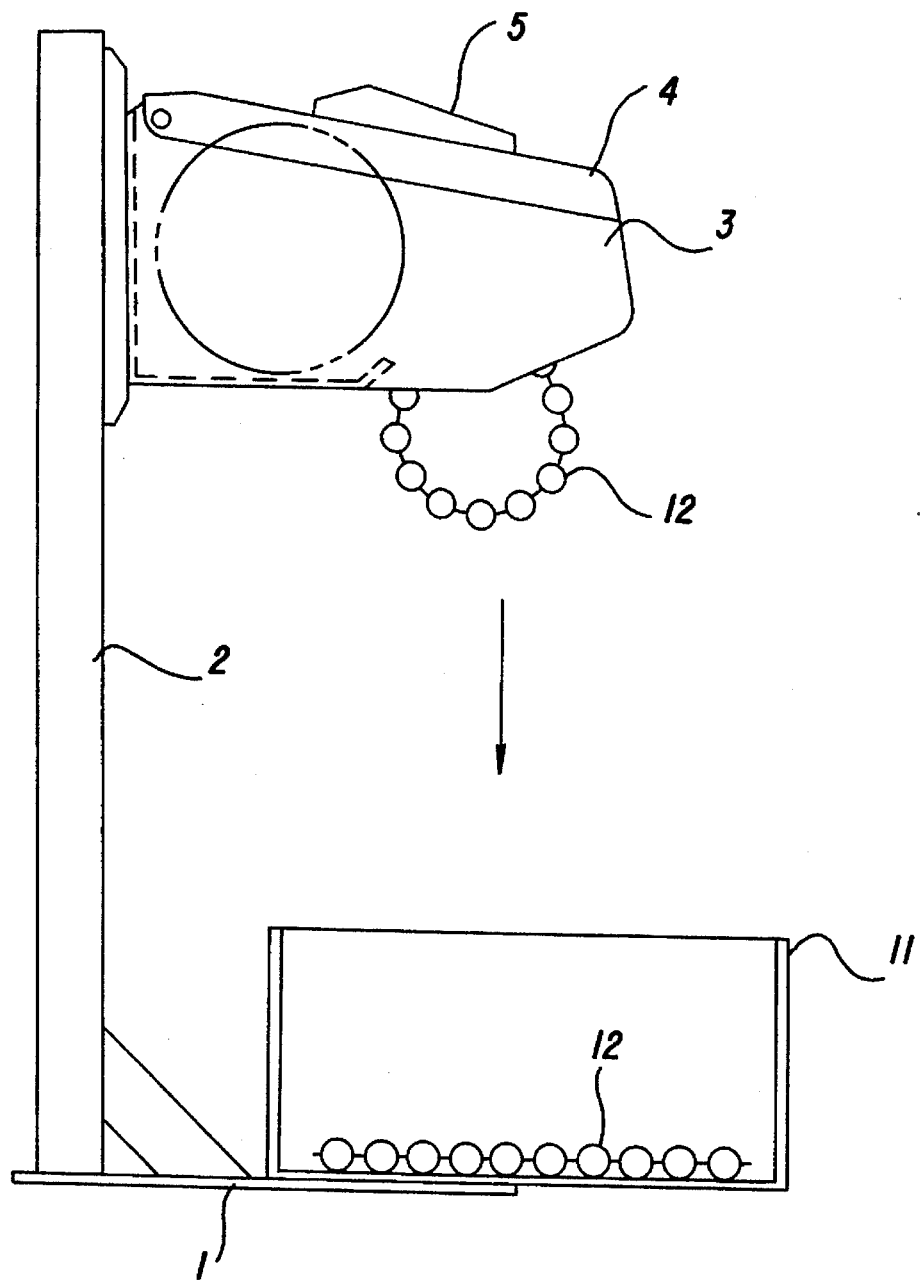
FIG. 4 is a side elevational view illustrating the entire construction of the embodiment of the invention.
Figure 5:
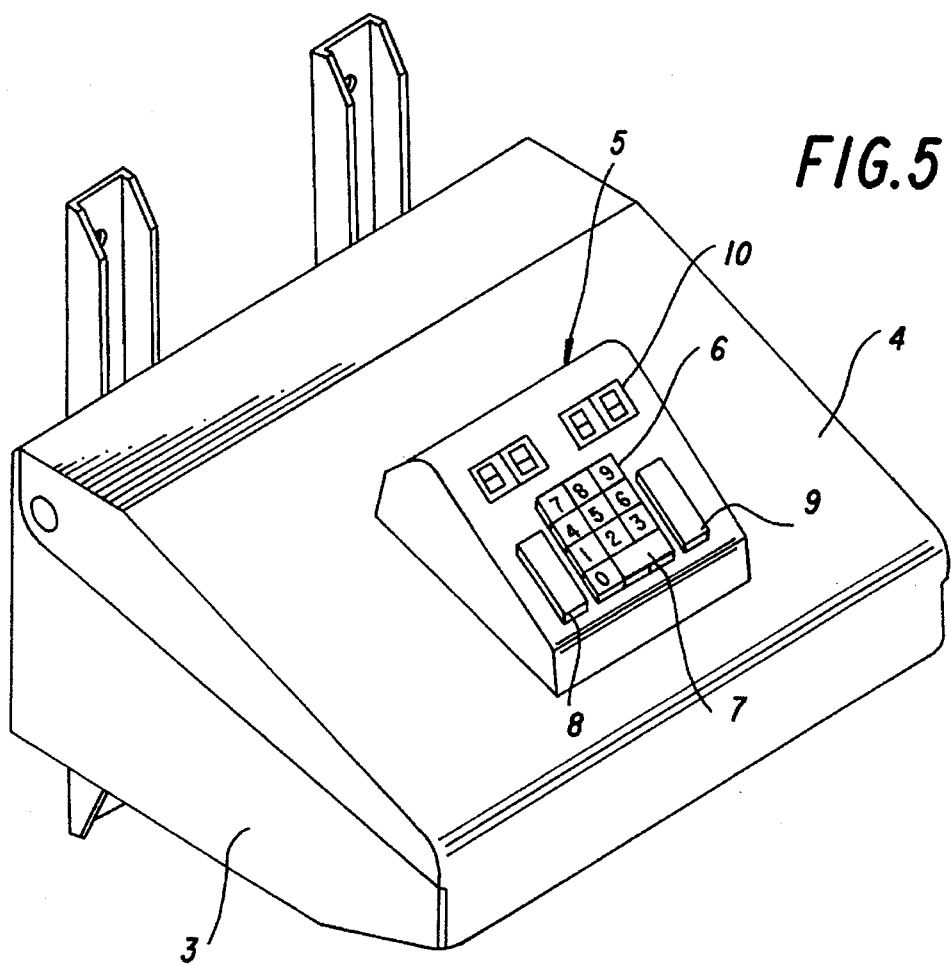
FIG. 5 is a perspective view of a box.

A gas injection device according to the invention includes, as shown in FIG. 4, a base 1, a support pole 2 upstanding from the base 1, and a box 3 attached to the support pole 2 at its upper portion. The upper surface of the box 3 is openably closed by a cover 4. The cover 4 is pivotable in a vertical plane. The cover 4 is provided, in its upper surface, with a control panel 5. The control panel 5 is provided, as shown in FIG. 5, number keys 6, a clear key or reset key 7, a start button 8, a stop button 9, and a display 10. The bottom of the box 3 is partly opened to form an opening.

A product container 11 having an upper opening is mounted on the base 1 at a position below the opening formed in the bottom of the box 3.

Figure 1:
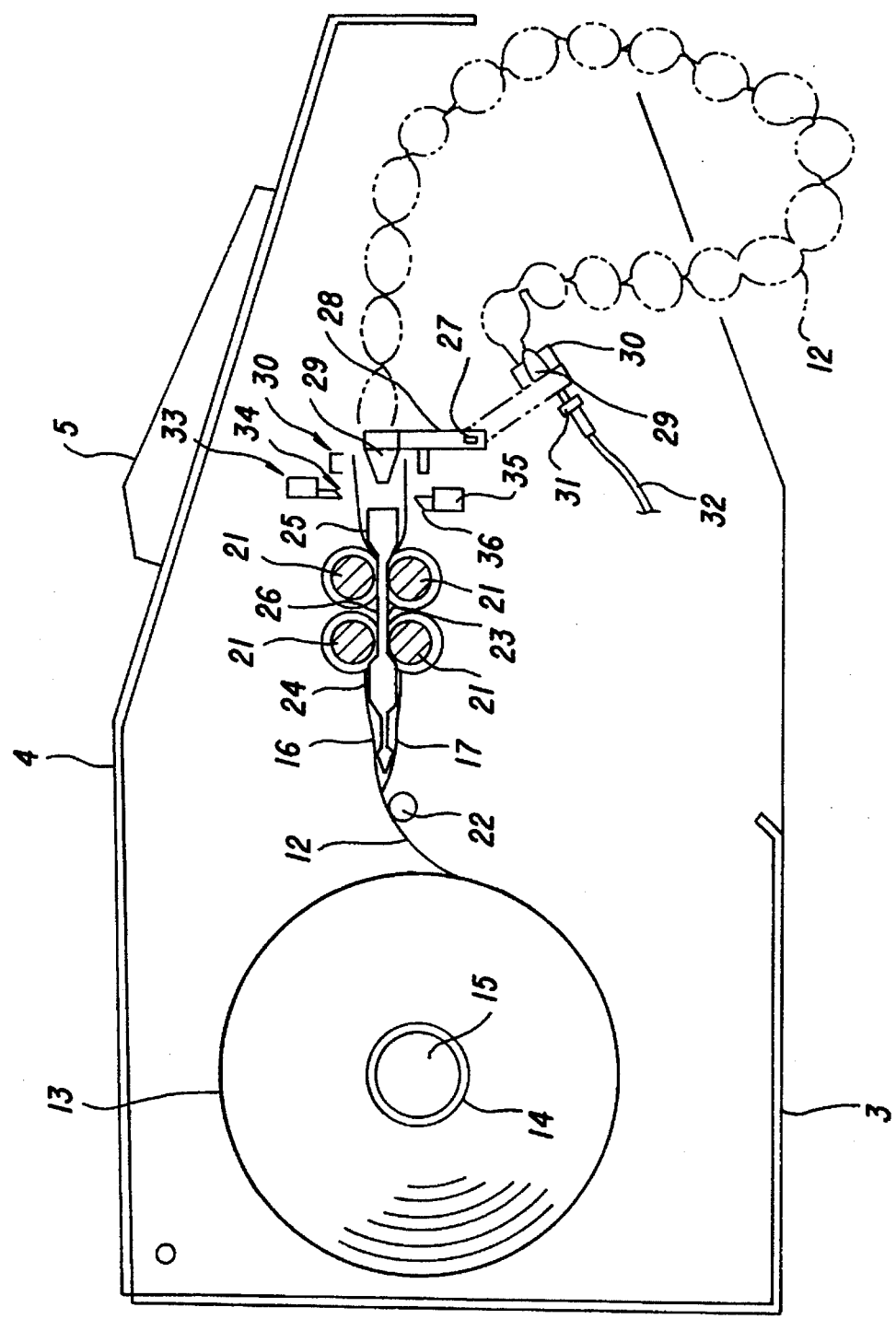
FIG. 1 is a cross-sectional view illustrating a main portion of one embodiment of the invention.

As shown in FIG. 1, a support 14 for rotatably carrying a roll 13 of the gas bag 12 having serial closed cells is provided within the box 3. The support 14 is disposed between the left-hand side wall and the right-hand side wall of the box 3. The support 14 removably and rotatably carries a bobbin shaft 15 of the roll 13 in a horizontal direction.

Figure 3:
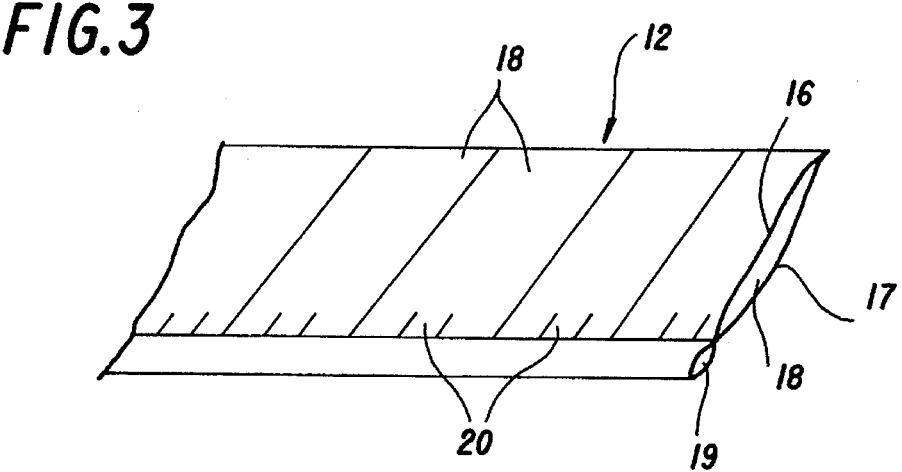
FIG. 3 is a perspective view illustrating a gas bag having serial closed cells.

The gas bag 12 having serial closed cells is a belt-like bag body including a front sheet 16 and a back sheet 17 superposed one another, as shown in FIG. 3. The bag body includes serial closed cells 18 disposed along the length of the bag body. The bag body also includes a passage 19 extending along the length of the bag body for supplying gas into the closed cells 18. A check valve 20 is disposed between the passage 19 and the closed cells 18. The gas bag 12 may be formed by repeatedly connecting, in the longitudinal direction, the gas bags disclosed in the above Japanese Patent Public Disclosure No. 01(1989)-153629 or Japanese Patent Public Disclosure No. 64(1989)-45277. Accordingly, detailed construction of the gas bag 12 will not be explained any further.

Within the box 3, two pairs of upper and lower pinch rollers 21 are disposed in a longitudinally spaced relationship. The pinch rollers 21 are rotatably disposed between the left-hand side wall and the right-hand side wall of the box 3. The pinch rollers 21 are driven by a drive means (not shown). The front sheet 16 and the back sheet 17 of the gas bag 12 supplied from the roll 13 are clamped between each pair of pinch rollers 21. Rotation of the pinch rollers 21 causes the gas bag 12 to be fed in the downstream direction. At the same time, successive gas bags 12 are supplied or unwound from the roll 13.

A guide roller 22 is rotatably arranged between the upstream pinch rollers 21 and the roll 13. The elongated gas bag 12 supplied from the roll 13 are guided by the guide roller 22 to the pinch rollers 21.

A core 23 is inserted into the passage 19 of the gas bag 12. The core 23 is formed as a deformed rod having a forward, enlarged portion 24, a rearward, enlarged portion 25, and a reduced portion 26 between the enlarged portions 24 and 25. The forward end portion of the forward, enlarged portion 24 is tapered.

Figure 2:
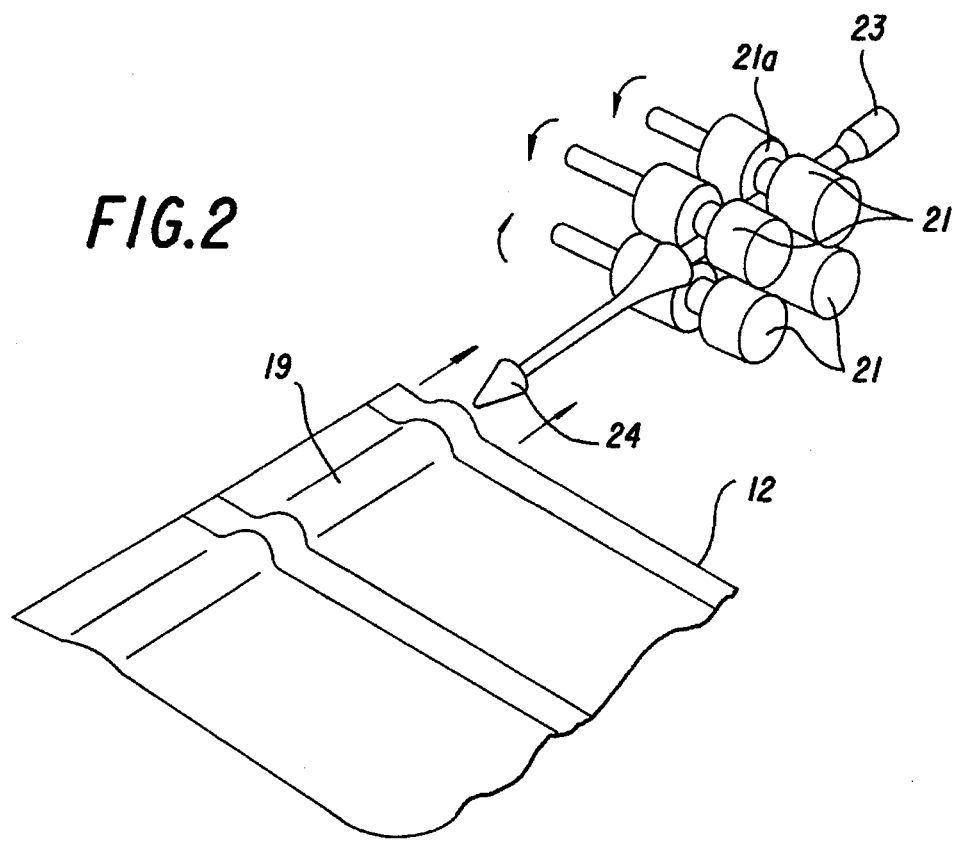
FIG. 2 is a perspective view illustrating a pinch roller.

The two pairs of pinch rollers 21 are so arranged that the reduced portion 26 of the core 23 is clamped thereby. Specifically, each of the pinch rollers 21 includes an intermediate, reduced portion 21a. The distance between the intermediate, reduced portions of the pair of upper and lower pinch rollers 21 is sized so as to prevent passage of the forward, enlarged portion 24 of the core 23. Thus, the core 23 clamped by the pairs of pinch rollers 21 is suitably limited in its longitudinal movement (see FIG. 2).

A swing arm 28 having a pivot axis 27 is disposed at a position downstream (rearward) of and below the core 23 clamped by the pinch rollers 21. The swing arm 28 is adapted to be pivoted in a vertical plane by means of a drive means (not shown). A nozzle adapter 29 is secured to the swing arm 28 at its free end.

The nozzle adapter 29 is positioned so as to be inserted into the passage 19 of the gas bag 12 as opened by the core 23, when the swing arm 28 is oriented in the vertical direction with the pivot axis 27 being disposed at its lower end. The swing arm 28 is adapted to be pivoted from the above vertical position in the downward and downstream direction.

A clamp means 30 is disposed at a position adjacent the free end of the swing arm 28. The clamp means 30 urges the wall defining the passage 19 of the gas bag 12 against the nozzle adapter 29, so as to maintain airtightness between the nozzle adapter 29 and the passage 19, when the nozzle adapter 29 is inserted into the passage 19 of the gas bag 12.

A stationary nozzle 31 is disposed at a position below the pivot axis 27 of the swing arm 28. The stationary nozzle 31 is removably connected with the nozzle adapter 29, when the swing arm 28 is pivoted downwardly. A hose 32 is connected to the stationary nozzle 31. The hose 32 is connected with a gas supply means (not shown). The air supply means includes, among others, an air compressor, an accumulator and a solenoid valve.

As will be appreciated from the foregoing, the means for transferring the nozzle adapter 29 according to the invention is constituted by the swing arm 28 and the associated drive means. It is noted, however, that the displacer means should not be limited to such a particular construction. For example, the displacer means may be constructed by an elevator member movable vertically downward from a position rearward of the core 23 clamped between the pinch rollers 21. The nozzle adapter 29 is attached to the elevator member. In this case, the stationary nozzle 31 is provided at the lower stroke end of the elevator member.

A nip means 33 and a cutter means 34 are disposed between the rearward end of the core 23 and the nozzle adapter 29 when the swing arm 28 has been pivoted upwardly to its vertical position.

The nip means 33 includes a pair of upper and lower clamp members 35. The pair of clamp members 35 are arranged to be moved toward and away from one another. When the gas bag 12 is pressingly clamped between the pair of clamp members 35, the passage 19 of the gas bag 12 is closed.

The cutter means 23 includes a pair of upper and lower cutters 36. The pair of cutters 36 are arranged to be moved toward and away from one another. When the gas bag 12 is pressingly clamped between the pair of cutters 36, the gas bag 12 is severed along its entire width.

In the illustrated embodiment, the clamp members 35 and the cutters 36 are provided in unison. Thus, the clamp members 35 and the cutters 36 are moved in the vertical direction at the same time.

Figure 6:
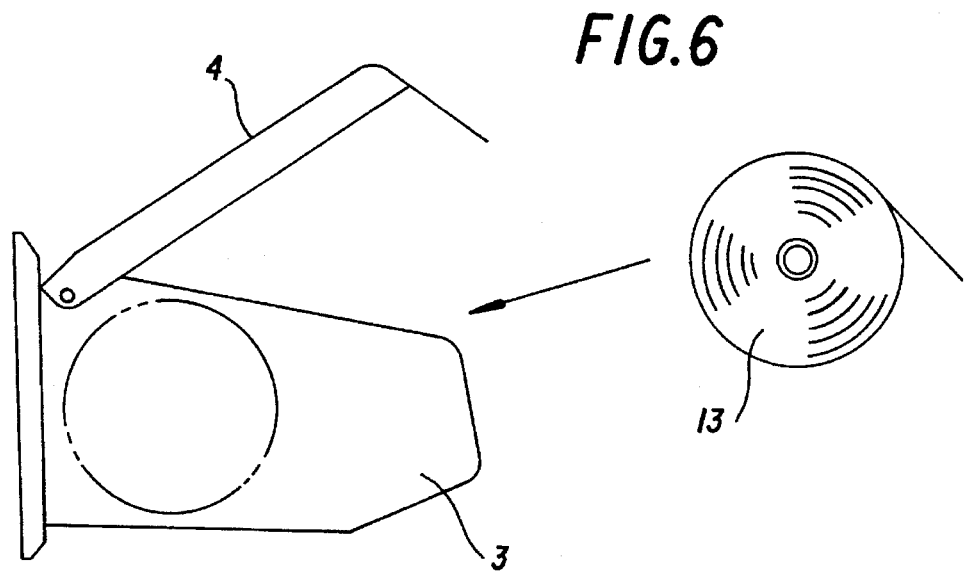
FIG. 6 is an illustrative view showing operation of the device according to the embodiment of the invention.

In operation of the illustrated embodiment according to the invention, the cover 4 of the box 3 is first opened, as shown in FIG. 6. Then, the roll 13 of the gas bags 12 is fitted around the support 14 within the box 3. A continuous length of gas bags 12 is manually withdrawn from the roll 13. The continuous length of gas bags 12 is clamped between the pinch rollers 21, with the core 23 being inserted into the passage 19 of the gas bag 12. One end of the passage 19 of the gas bag 12 is inserted by the core, whereby it is opened.

Since a preparatory work for initiation of the operation of the device has been completed in the above manner, the cover 4 is closed. Then, the number keys 6 are operated so as to set a required cut length and a required number. The required cut length may be set by designating the number of closed cells 18 using the number keys 6.

When the start button B is depressed, the swing arm 28 is pivoted upwardly as shown in FIG. 1, so that the nozzle adapter 29 is inserted into the opening of the passage 19. Then, the wall defining the passage 19 of the gas bag 12 is pressed against the nozzle adapter 29 by means of the clamp means 30. At this time, the nip means 33 and the cutter means 34 are opened.

The pinch rollers 21 are driven, so that the gas bag 12 is fed downstream by the pinch rollers 21. At this time, the core 23 also tends to be moved downstream together with the gas bag 12. It is noted, however, that, since the core 23 is clamped, at the reduced portion 26 thereof, by the pinch rollers 21, the forward, enlarged portion 24 of core 23 cannot pass through the gap between the pair of pinch rollers 21. Thus, the core 23 is prevented from moving in the downstream direction, so that the core 23 is remained at the position of the pinch rollers 21, whereby only the gas bag 12 is moved downstream. When the gas bags 12 in the required number preset in the control panel 5 have been fed, actuation of the pinch rollers 21 is stopped.

When feeding the gas bags 12, the swing arm 28 is pivoted downwardly. This pivotal movement causes the nozzle adapter 29 fitted in the opening of the passage 19 to be moved downwardly. When the nozzle adapter 29 reaches its lowermost position, the nozzle adapter 29 is engaged with the stationary nozzle 31 and automatically connected therewith. Then, the swing arm 28 is stopped.

When the pinch rollers 21 have been stopped, the terminal end of the passage 19 of the gas bag 12 is pressingly clamped by means of the clamp members 35 of the nip means 33, whereby the terminal end of the passage 19 is closed. At the same time, the continuous length of gas bag 12 is severed by the cutters 36 of the cutter means 34.

With the terminal end of the passage 19 being closed by the nip means 33, the passage 19 is supplied with a flow of gas through the nozzle adapter 29 by means of the gas supply means. The gas supplied is flown into the individual closed cells 18 through the respective check valves 20, since the terminal end of the passage 19 is closed by the nip means 33. Each of the closed cells 18 is inflated by the gas supplied. The gas flown into the individual closed cells 18 is prevented from backflowing into the passage 19 by reason of the provision of the check valves 20.

When a predetermined volume of gas is supplied to each of the closed cells 18, gas supply from the gas supply means is stopped. Subsequent release of the nip means 33 and of the clamp means 30 causes a predetermined length of gas bags 12 supplied with gas to be fallen into the product container 11 for accommodation therein.

Then, the swing arm 28 is pivoted upwardly, so that the nozzle adapter 29 is fitted within the opening of the passage 19 of the gas bag 12. Thereafter, the above mentioned steps are repeated, so that a predetermined length of gas bags 12 supplied with gas is produced. When gas bags in the predetermined number preset in the control panel 5 have been produced, all actuation is stopped so as to complete the operation.

It should be noted that the invention is not limited to the above embodiment.

According to the invention, a core is employed which is movable relative to the gas bag, but is not changed in its absolute position. The core is inserted into the passage of the gas bag so that one end of the passage is opened. This permits automatic insertion of the nozzle adapter into the open end of the passage, so that gas injection operation may be automatically performed.

We claim:

1. A gas injection device for supplying gas into a gas bag (12), the gas bag including a front sheet (16) and a back sheet (17) superposed one another to form a belt-like bag body, the bag body including a plurality of closed cells (18) serially arranged in the length of the gas bag, the bag body also including a passage (19) extending along the length of the gas bag for supplying gas into the individual closed cells, the bag body further including a check valve (20) between the passage (19) and the individual closed cells (18), comprising:

a core (23) adapted to be inserted into said passage (19), said core having a longitudinally intermediate portion (26) of a reduced diameter;

at least two pinch rollers (21) for pressingly clamping said gas bag (12) inwardly from the front sheet (16) and back sheet (17) of said gas bag (12) at the position of said longitudinal intermediate portion (26) of a reduced diameter of said core (23), so as to drive said gas bag (12) in the longitudinal direction;

a nozzle adapter (29) adapted to be withdrawably insertable into an opening of said passage (19) which is opened by said core (23) inserted therein;

a displacer means for displacing said nozzle adapter (29) in a manner in which said nozzle adapter (29) is not displaced from the opening of said passage (19), when the gas bag (12) is driven in the longitudinal direction;

a gas supply means (31, 32) adapted to be connected with said nozzle adapter (29);

a nip means (33) for pressingly clamping said gas bag (12) inwardly from the front sheet (16) and back sheet (17), so as to close said passage (19) of said gas bag (12) having been displaced a predetermined distance in the longitudinal direction at the downstream terminal end of said core (23); and a cutter means (34) for severing the terminal end of said gas bag (12) along its entire width.

2. A gas injection device according to claim 1, wherein said core (23) is constituted by a deformed rod, said deformed rod including a forward end portion (24) of an increased diameter, a rearward end portion (25) of an increased diameter and an intermediate portion (26) of a reduced diameter, said forward end portion (24) of an increased diameter having a tapered end.

3. A gas injection device according to claim 2, wherein said pinch rollers (21) are disposed in two pairs spaced along the longitudinal direction, each pair including two pinch rollers disposed adjacent said front sheet (16) and the back sheet (17), respectively, in an opposed manner, each pinch roller (21) being formed, at its longitudinal intermediate portion, with a stepped portion (21a) of a reduced diameter, and wherein said intermediate portion (26) of a reduced diameter of said core (23) is pressingly clamped between the stepped portions (21a) of a reduced diameter of each of said pairs of pinch rollers (21) through said front sheet (16) and said back sheet (17).

4. A gas injection device according to claim 1, comprising a swing arm (28) having a free end and a pivot axis (2) disposed at a position rearward of and below the core (23) clamped by said pinch rollers (21), wherein said nozzle adapter (29) is secured to said free end of said swing arm (28).

5. A gas injection device according to claim 4, comprising a clamp means (30) mounted on said swing arm (28) at the free end thereof, said clamp means (30) pressing the wall defining the opening of said passage (19) of said gas bag (12) inwardly against said nozzle adapter (29), so as to maintain airtightness between said nozzle adapter (29) and said opening of said passage (19), when said nozzle adapter (29) is inserted into the opening of said passage (19) of said gas bag (12).

6. A gas injection device according to claim 5, comprising a stationary nozzle (31) positioned below said pivot axis (27) of said swing arm (28), said stationary nozzle (31) adapted to be removably connected with said nozzle adapter (29) when said swing arm (28) is pivoted downwardly, said gas supply means being connected with said stationary nozzle (31) through a hose (32).

7. A gas injection device according to claim 1, comprising an elevator member movable vertically downwardly from a position rearward of said core (23) clamped by said pinch rollers (21), wherein said nozzle adapter (29) is mounted on said elevator member, and wherein a stationary nozzle is provided at the lower stroke end of said elevator member, said stationary nozzle being connected with said gas supply means and removably connected with said nozzle adapter (29).

* * * * *

UNITED STATES PATENT AND TRADEMARK OFFICE
CERTIFICATE OF CORRECTION

PATENT NO. : 5,581,983
DATED : December 10, 1996
INVENTOR(S) : MURAKAMI et al.

It is certified that error appears in the above-indentified patent and that said Letters Patent is hereby corrected as shown below:

On the title page,
Item [75], line 1 please delete "Ayabe, Japan". Line 2 please insert therefor -Takayuki Tamura, both of Ayabe,

Japan--.

Signed and Sealed this

Twenty-second Day of April, 1997

*Attest:*

BRUCE LEHMAN

*Commissioner of Patents and Trademarks*

*Attesting Officer*